Oct. 23, 1951   J. M. WILSON ET AL   2,572,293
TEMPERATURE CONTROL APPARATUS
Filed Feb. 6, 1948   3 Sheets-Sheet 1

Inventors
JOHN M. WILSON
STANLEY W. NICKELLS
MYRON R. SMITH
By George H. Fisher
Attorney Oct. 23, 1951  J. M. WILSON ET AL  2,572,293
TEMPERATURE CONTROL APPARATUS
Filed Feb. 6, 1948  3 Sheets-Sheet 2

Inventors
JOHN M. WILSON
STANLEY W. NICKELLS
MYRON R. SMITH

George H. Fisher
Attorney

Oct. 23, 1951  J. M. WILSON ET AL  2,572,293
TEMPERATURE CONTROL APPARATUS
Filed Feb. 6, 1948  3 Sheets-Sheet 3

Inventors
JOHN M. WILSON
STANLEY W. NICKELLS
MYRON R. SMITH

By George H. Fisher
Attorney

Patented Oct. 23, 1951

2,572,293

UNITED STATES PATENT OFFICE 2,572,293

TEMPERATURE CONTROL APPARATUS

John M. Wilson, Minneapolis, Stanley W. Nickells, St. Louis Park, and Myron R. Smith, Minneapolis, Minn., assignors to Minneapolis-Honeywell Regulator Company, Minneapolis, Minn., a corporation of Delaware Application February 6, 1948, Serial No. 6,754

9 Claims. (Cl. 236—91)

The present invention relates to an improved type of temperature control or regulating apparatus of the type employing temperature sensitive resistors in a balanced electrical network. The unbalance of the network is an indication of the need for operation of some appropriate heating device so that a desired temperature will be maintained in the temperature regulated area. The invention is particularly related to temperature control apparatus using a balanced bridge and an electrical cycling unit which cycles the balanced electrical network between an unbalanced and balanced condition and consequently the heating apparatus so that a varying amount of heat will be supplied to the area being regulated under varying load conditions.

In some present day applications of temperature control apparatus, it has been proposed to use a balanced electrical bridge network with a number of temperature sensitive resistors for maintaining a constant temperature in a space to be heated.

In conjunction with the balanced bridge of the present invention, a cycling resistor is used to cycle the balance point of the bridge at a rate that may be determined by the outdoor temperature as well as by the temperature of the space being controlled. This cycler may consist of a temperature sensitive resistor which has heat applied thereto each time the heating apparatus is rendered operative to furnish heat to the space whose temperature is being controlled. When employing such an arrangement it is imperative that the balance of the network be affected only by the temperatures which are indicative of a controlling condition. If the resistors of the balanced network are sensing temperatures other than the controlling temperatures, the temperature of the space being regulated will vary over wide ranges in an inconsistent manner and this is generally quite undesirable.

The present invention proposes placing the elements of the temperature control network in such a manner that they will only be affected by the temperatures which produce the desired controlling effect.

Further, the present invention proposes a compact central control housing in which are located the elements of the control network which are not sensing external controlling temperatures and which are located within a space whose temperature is relatively constant and are all subjected to a common ambient temperature. This is accomplished by providing a common housing in which the control network resistors having zero temperature coefficients of resistance are located and also where the cycling resistor and calibration potentiometer is located. Also, within the common housing are the electrical components associated with the electrical network and these components may include an amplifier, a power transformer which forms the source of power for the apparatus, and a control relay. These components when in operation dissipate a certain amount of heat which tends to affect the temperature of the elements in the housing. As the cycler resistance is located in the housing, it is also affected by the dissipated heat. To compensate for this, an additional temperature sensitive resistor is provided in the housing which is also connected in the electrical network to be in counterbalancing relation to the cycler resistor. This resistor is an ambient temperature compensating resistor which prevents the heat dissipated by the electrical components from affecting the balance of the electrical network. A further source of heat is associated with the cycler resistor and this source of heat becomes effective whenever heat is being supplied to the area whose temperature is being regulated. This additional source of heat is generally a resistance type of heating element which is located in heat exchange relationship with respect to the cycling resistor. To prevent the heat from this resistance element from affecting the other components in the housing, the resistance element is located at a point remote from the other elements and external of the general housing structure where the network elements are retained. Such an arrangement as this makes it possible to provide a compact and well assembled control apparatus for maintaining a constant temperature which will be affected only by the temperatures which produce a desired controlling function.

Located externally of the compact central housing or panel structure are a pair of space temperature sensing resistors and an outdoor temperature sensing resistor whose resistance changes result in the control of the network and components in the common housing.

It is therefore an object of the present invention to provide an improved temperature regulating apparatus employing temperature sensitive resistors in an electrical network where the temperature sensitive resistors are effective to regulate the balance of the network in accordance with temperatures which are a measure only of the controlling conditions.

A further object of the present invention is to provide an improved temperature regulating apparatus using a Wheatstone bridge wherein the resistors of the bridge which have zero temperature coefficients of resistance are all compactly located in an enclosure at a common point.

Still another object of the present invention is to provide an improved temperature regulating apparatus of the Wheatstone bridge type in which is employed a resistance cycler unit and a heater therefor where the resistance cycler is located in a common housing with other elements of the bridge and is subjected to an ambient temperature and providing further in the bridge a temperature sensitive resistor connected in counterbalancing relation in the bridge to the resistance cycler and subjecting the same to the same ambient temperature as the cycler resistance.

A still further object of the present invention is to provide an improved temperature regulating apparatus which includes in addition to the objects outlined above a resistance wire heater unit which is associated with the cycler resistor and is located at a point with respect to the other elements of the electrical bridge so as to have an effect only upon the cycler resistor.

Other objects of the present invention will be apparent from the consideration of the accompanying specification, claims and drawings in which:

Figure 1:
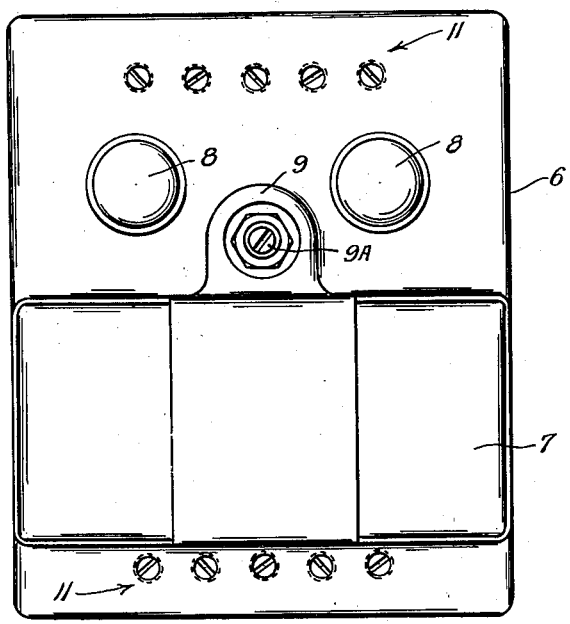
Figure 1 is a front elevational view of the central panel or housing of the invention with the electrical components associated with the control apparatus shown as they may be located on the panel.

Referring now to Figure 1, which is a front elevational view of the central panel or housing associated with the present invention, the numeral 6 indicates the main panel or housing in which are located the elements of the control network and on which is located an enclosure 7 which may contain a transformer, relay, and other components associated with the control apparatus. A pair of electron discharge devices 8 are also located on the panel. Located within a recess 9 is a calibration adjustment screw 9A. A plurality of terminals indicated generally at 11 are provided for connecting the panel of the apparatus to form a complete control apparatus.

Figure 2:
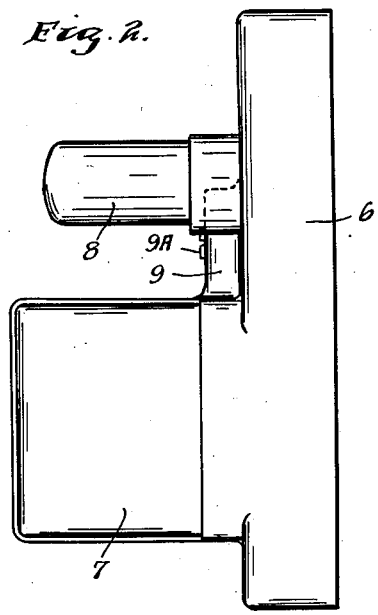
Figure 2 is a side view of the panel section shown in Figure 1.

Figure 2, which is a side view of the showing in Figure 1, shows further how the enclosure 7 and tubes 8 may be located on the panel 6.

Figure 3:
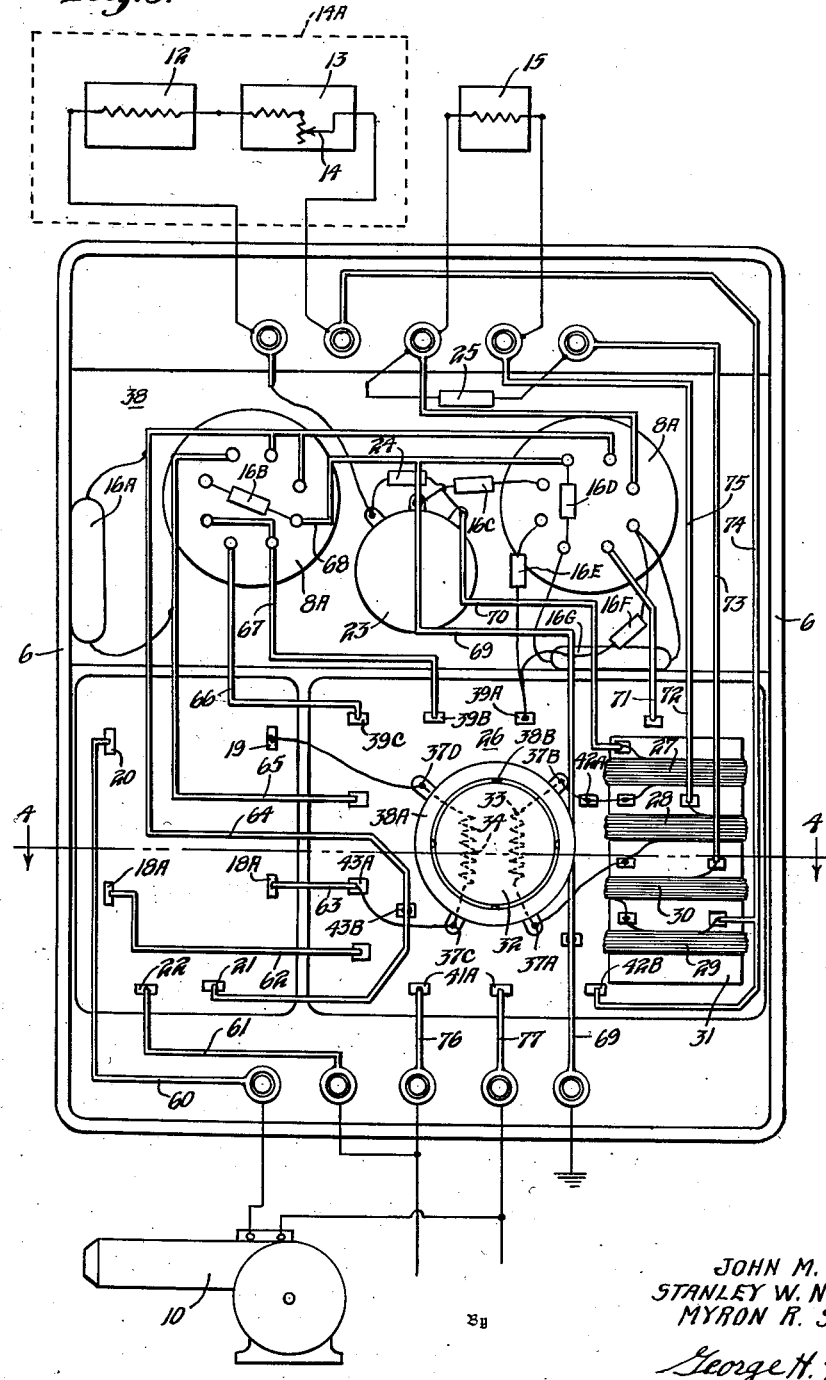
Figure 3 is a rear elevational view of the subject control apparatus showing the compact relation of the elements of the control apparatus and the electrical terminals with the sensing and controlled equipment attached.

Referring now to Figure 3, in which the rear of the panel is illustrated along with various elements connected to the panel, the numeral 10 represents an oil burner which may be used to supply heat to the area whose temperature is being regulated. The burner 10 is energized whenever the control apparatus within the central panel or housing 6 indicates the need for operation of the burner. External of the housing 6 are a number of temperature sensitive resistor elements which consist of a room temperature sensitive resistor 12, a second room temperature sensitive resistor 13 having a selecting potentiometer 14, the latter two resistors being located in a room 14A whose temperature is being regulated, and an outdoor temperature sensing resistor 15. By providing two room temperature sensing resistors it is possible by spacing them at opposite ends of the room to get an average temperature measurement of the temperature in the room 14A. Each of these temperature sensitive resistors are so connected with the electrical elements within the housing 6 as to form a balanced Wheatstone bridge circuit whose balance is detected by an amplifier as will be explained in connection with Figure 5.

The amplifier of the subject apparatus includes the electron discharge devices indicated at 8 in Figures 1 and 2 which are mounted in tube sockets 8A indicated in Figure 3. Associated with the tube socket connections are resistors 16 B, C, D, E and F and condensers 16A and G. This amplifier is operative to energize a control relay whenever the unbalance of the bridge indicates a need for operation of the burner 10. The numerals 18A indicate the relay winding terminals while the numerals 19 and 20 indicate the terminals for the switch blades of the relay which are normally biased out of engagement with their associated switch contacts which are connected to terminals 21 and 22.

Other elements included in making up the control bridge are a calibration potentiometer 23 and a calibration resistor 24. A resistor 25 is a balancing resistor for counterbalancing the resistance in the bridge due to the outdoor resistor 15. Mounted within the enclosure, indicated at 26, are the remaining elements of the Wheatstone bridge. These elements consist of wire wound resistors 27, 28 and 29 having a zero temperature coefficient of resistance and an ambient temperature compensating resistor 30 all wound on a panel member 31. Also found within the enclosure 26 is a cycling resistor 33 shown in dotted lines in Figure 3 which is located within a housing or container 32 along with a resistance type of heater 34, also shown in dotted lines, in Figure 3, which is used to heat the cycling resistor whenever the control apparatus is energizing the burner 10 in a manner to be explained hereinafter.

Figure 5:
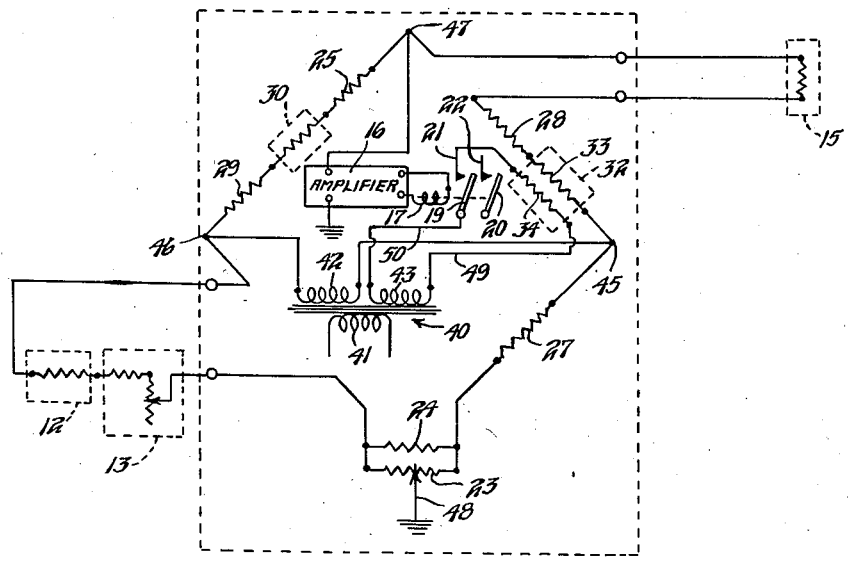
Figure 5 is the electrical circuit diagram of the layout shown in Figure 3.

A plurality of terminals project into the enclosure 26 and are actually power transformer terminals with the numeral 41A indicating the input terminals to a primary winding 41, shown in Figure 5. Power supply terminals for the secondary 42 shown in Figure 5 which is associated with the control network are indicated at 42A and B in Figure 3 while terminals 43A and B provide a connection for the resistance heater 34 to a secondary 43, shown in Figure 5. Other terminals 39A, B and C may connect to the filament winding on the transformer power winding of the transformer or additional condensers associated with the amplifier.

Interconnecting the electrical elements and components of the control apparatus are a plurality of electrical conductors numbered 60 through 77 and which may be of the type that are stamped out in a single operation in the form of a grid. The grid will, when stamped, be a single unit which is placed upon the appropriate terminals and then the supporting connections of the grid are cut so that the electrical connectors will form the desired circuit such as is shown in Figure 3.

Figure 4:
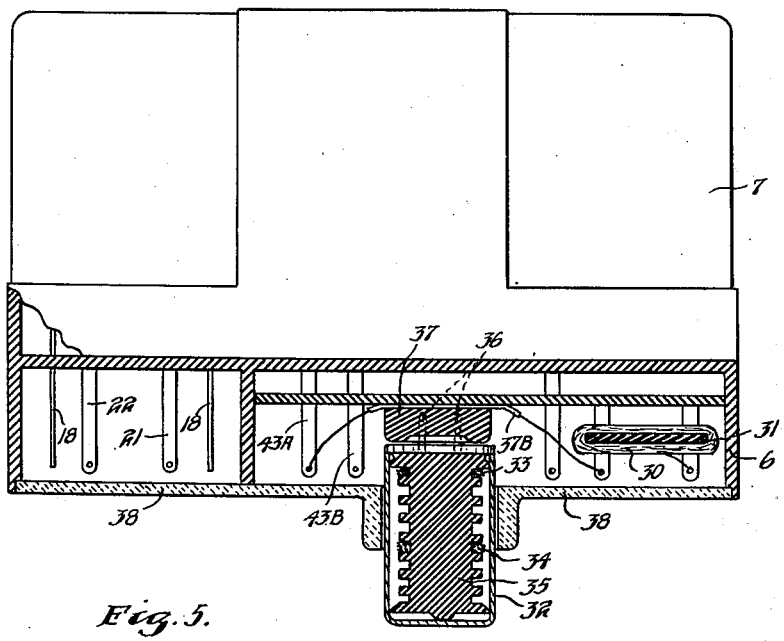
Figure 4 is a cross section of the central housing taken along the section line 4—4 of Figure 3.

Covering the conductors and elements of the apparatus is a transparent cover 38 of suitable insulating material such as polystyrene plastic which is best shown in Figure 4. This cover provides a locating ring 38A for the cycler container 32. Spaced about the edge of the cycler ring are spacing lugs 38B which separate the container 32 from the panel ring 38A to prevent the heat generated within the container 32 by element 34 from being conducted away by the panel cover 38 and panel ring 38A.

The cross-sectional view of the panel or housing 6 as shown in Figure 4 is a cross-sectional view taken of Figure 3 along the section line marked 4—4. In Figure 4 the numeral 33 represents the cycling resistor and the numeral 34 represents the electrical heating resistor which is associated with the resistor 33. Both the cycling resistor 33 and the heater 34 are wound on a bobbin 35, the latter of which is adapted for removable mounting by a plurality of prongs 36 which makes supporting and electrical connection in a socket 37. The cover panel 38 is used to provide protection for the elements that are located within the secondary housing or enclosure 26. With this panel in position, the substantially draft-free enclosure thus formed protects the elements of the network from circulating air currents that might affect the general ambient temperature therein.

Referring again to Figure 3, the dotted line within the housing 32 represents the cycling resistor 33 which is electrically connected to the socket terminals 37A and 37B while the heating resistor 34 is shown electrically connected to the socket terminals 37C and 37D.

Figure 5 shows schematically the circuit of the control apparatus to which our invention is applied. Components which are similar to those shown in Figures 1 through 4 carry reference numerals which correspond to the reference numerals of the previous figures. The only additional components of Figure 5 not shown in Figures 1 through 4 is a relay 17 and a transformer 40 which may be seen to consist of a primary winding 41 which may be connected to any suitable source of power not shown, and a pair of secondary windings 42 and 43.

*Operation*

In discussing the operation of the subject control apparatus, reference will be had to Figure 5. The main control element for the subject control apparatus may be seen to be a Wheatstone bridge which has input terminals at 45 and 46 to which are connected the ends of the secondary 42. The output terminals for the bridge are indicated at 47 and at ground terminal 48. The elements of the bridge traced clockwise from the input terminal 45 includes the fixed resistor 27, parallel connected calibration potentiometer 23 and resistor 24, room temperature sensing resistor 13, room temperature sensing resistor 12, input terminal 46, fixed resistor 29, ambient temperature compensating resistor 30, balancing resistor 25, output terminal 47 outdoor temperature sensing resistor 15, fixed resistor 28, and cycling resistor 33 back to the input terminal 45.

Connected to the output terminals of this Wheatstone bridge is a detecting means which may be the electronic amplifier discussed above and indicated in the block 16. This amplifier 16 is operative whenever the unbalance of the bridge is in a direction calling for the need for heat in the space whose temperature is being controlled to energize the relay 17. When the relay 17 becomes energized, the switch blades 19 and 20 move into engagement with the respective contacts 21 and 22. When the switch blade 20 engages switch contact 22, a circuit is completed to some appropriate heating device which may be an oil burner as indicated at 10 in Figure 3. When the switch blade 19 moves into engagement with switch contact 21 an energizing circuit is completed to the resistance heater 34 from the secondary 43 and this circuit may be traced from the right hand terminal of secondary 43 through conductor 49, resistance heater 34, switch contact 21, switch blade 19, and conductor 50 back to the left hand terminal of secondary 43. This resistance heater will apply heat to the cycling resistor 33 and after a predetermined time delay will heat the resistor 33 sufficiently to move the balance of the Wheatstone bridge back toward the satisfied position in a manner to be more fully described hereinafter.

Assume first that the temperature in the space where the temperature is being regulated is low. This temperature will affect the resistance of the room temperature sensing resistors 12 and 13 and their resistance will be decreased. This resistance change will cause the Wheatstone bridge to be unbalanced in a direction to call for heat. This unbalance when detected by the amplifier 16 will result in the burner 10 being brought into operation so that heat will be supplied to the room. This unbalance will remain until the room becomes sufficiently heated to change the resistance of the sensing resistors 12 and 13 back toward the balance point, that is, to change the resistors so that their resistance will increase. As pointed out above, when the burner 10 is energized, the resistance heater 34 is heating the cycling resistor 33. The heating of the resistor 33 increases its resistance and tends to move the balance point of the bridge in the satisfied or no heat demand direction. However, since the ratio of resistance between the cycling resistor 33 and the room resistors 12 and 13 is quite large, say for example, 1 to 15, this change in resistance of the cycling resistor 33 will have little effect until the room temperature is approximately at the desired value. When the room temperature is near the desired value, the change in resistance of the cycling resistor 33 will be sufficient to balance the bridge and the burner will be shut down. The cycling resistor 33, then in effect, acts as a heat anticipator which prevents the storing of additional heat in the heating system which in turn would carry the room temperature beyond the desired value. The natural time lag in the system is such that the heat present in the system, when shut down by the unbalance of the heat anticipator or the cycling resistor, will bring the room temperature up to the desired value.

With the room temperature constant, assuming an outdoor temperature that is considerably lower than the room temperature, the cycler resistance will be effective periodically, by being heated and then cooling, to unbalance the bridge to call for heat before the room temperature actually changes. In other words, the cycler resistor will see that a constant amount of heat is applied to the room before the room temperature changes and indicates a need for heat by a change in the resistance of room resistors 12 and 13. The cycling rate will remain constant as long as the demand for heat remains constant. The rate at which the cycling will occur is dependent on the outdoor temperature. Since the outdoor temperature resistance sensing element 15 is in the same leg of the Wheatstone bridge as the cycling resistor, and since both have the same temperature coefficient of resistance, the colder the resistor 15 becomes, the longer it will be necessary for the resistance heater 34 to heat the cycling resistor 33 to bring the bridge back to a balanced condition. In other words, a drop in outdoor temperature as indicated by the outdoor resistor 15 indicates to the control apparatus that there will be a need for additional heat to be supplied to the room in order to maintain a desired temperature. On the other hand, if the outdoor resistor 15 is at the same temperature as it is desired to maintain the temperature of the regulated room, the cycling resistor will not, upon cooling, unbalance the bridge for there is no need for operation of the burner 10. In other words, there is no demand for heat indicated by the control network. This outdoor compensating resistor 15 is chosen to give the desired amount of compensation and is generally selected to overcompensate the control temperature. That is, when there is a large drop in outdoor temperature, it is best to increase the room temperature by a slight amount to compensate for the cooling of the walls of the room 14A. However, under constant load conditions a constant predetermined temperature will be maintained which will not tend to fluctuate.

In order to form a balanced Wheatstone bridge while maintaining a certain ratio between the resistance elements which are sensitive to the controlling temperatures, it is necessary to provide additional resistors which are not temperature sensitive or which have zero temperature coefficients of resistance. It is desirable to locate these resistors in a compact common area where they will be readily accessible. These resistors 27, 28 and 29, are shown located in Figure 3 as being wound about a panel member 31. The panel 31 is in the enclosure 26, which is actually an enclosure behind the panel 38, as shown in Figure 4. The calibrating resistor 24 and calibration potentiometer 23, as well as the balancing resistor 25, are quite small when their resistances are compared to the resistances of the resistors 27, 28 and 29, and they are in the main housing 6. Temperature changes in the main housing 6 will have little effect upon their resistance or the balance of the bridge since these resistors are so small and further, since the temperature in the housing 6 will be maintained at a nearly constant value since the transformer and other electrical components will tend to dissipate a constant amount of heat.

As pointed out above, the cycling resistor 33 is also located within the housing 26 as may be seen in Figure 4. This cycling resistor, since it it within the enclosure 26, is subjected to the ambient temperature condition within the enclosure. As the cycling resistor is temperature sensitive, its resistance will be affected by this ambient temperature. For this reason the ambient temperature compensating resistor 30 is provided. The compensating resistor 30 is so located within the enclosure 26 that it is subjected to the same ambient temperature as the cycling resistor 33. The resistor 30 is connected in the Wheatstone bridge in counterbalancing relation to the cycler, as may be seen in Figure 5, so that changes in the ambient temperature in the secondary housing 26 will not affect the balance of the bridge. It will also be noted, as pointed out above, that the resistance heater 34 is so located that it will heat the cycling resistor 33 and still have no appreciable effect upon the temperature of the other elements within the secondary housing 26. This is done by locating the resistance heater at a point remote or external of the housing 26 by winding the same on the bobbin 35 and mounting the bobbin so that the heater is located at a point remote from the other elements within the housing 26. This is best shown in Figure 4.

From the foregoing it may be seen that a temperature regulating apparatus has been provided which is designed to maintain a desired temperature within the space being heated by employing a balanced bridge having temperature sensing resistor elements whose resistances are effective to regulate the balance of the bridge only when the temperatures which are functions of the amount of regulation vary. Further, we have provided a regulating apparatus using a resistance cycling unit in a Wheatstone bridge and have so located the cycling resistor with respect to the heater for the cycling resistor that the heat from the heater will affect only the resistance or temperature of the cycling resistor and not the temperature of the other electrical elements which are compactly located within a common housing.

Although we have described our invention in connection with a temperature regulating apparatus operating an oil burner, and while it is well suited for use there, it is to be understood that it could receive application with any appropriate type of heating apparatus. Further, many modifications will suggest themselves to those skilled in the art and we therefore intend to be limited solely by the scope of the appended claims.

We claim as our invention:

1. In combination, in a temperature regulating apparatus, a first temperature responsive resistance element located in an area whose temperature is being regulated, an electrical component housing having input and output terminals, and an enclosure therein sealed from drafts, said enclosure being heated by the dissipation of heat from the components in said housing, a pair of said input terminals adapted for connection to a source of power, a second temperature responsive resistance element located within said enclosure of said housing, a resistance heating means exposed in heat exchange relationship to said second resistance element adapted to heat said element when heat is supplied to the space whose temperature is being regulated, an electrical network including said first and second temperature responsive resistance elements, said network becoming unbalanced when said first temperature responsive resistance element indicates a need for heat or the temperature of said second resistance element drops below a predetermined value, means sensitive to the unbalance of said network for initiating operation of heating means connected to said output terminals and for energizing said resistance heating means, a third temperature responsive resistance element, said third resistance element being located in said enclosure of said housing and sensitive to the ambient temperature of said enclosure, and means connecting said resistance element in said network in counterbalancing relation to said second element to prevent the ambient temperature affecting said second resistance element from unbalancing said network.

2. In combination, in a temperature regulating apparatus, a first temperature responsive resistance element located in an area whose temperature is being regulated, an electrical component housing having input and output terminals, a pair of said input terminals adapted for connection to a source of power, a second temperature responsive resistance element located within said housing, a resistance heating means exposed in heat exchange relationship to said second resistance element adapted to heat said element when heat is supplied to the space whose temperature is being regulated, an electrical network including said first and second temperature responsive resistance elements, said network becoming unbalanced when said first temperature responsive resistance element indicates a need for heat or the temperature of said second resistance element drops below a predetermined value, means sensitive to the unbalance of said network for initiating operation of heating means adapted to be connected to said output terminals and for energizing said resistance heating means, a third temperature responsive resistance element, said third resistance element being located in said housing and sensitive to the ambient temperature of said housing, means connecting said resistance element in said network in counterbalancing relation to said second element to prevent the ambient temperature affecting said second resistance element from unbalancing said network, and means supporting said resistance heating means at a position remote from said housing so as to have no appreciable heating effect upon the ambient temperature of said housing while heating said second resistance element.

3. In combination, in a temperature regulating apparatus, a first temperature responsive resistance element located in an area whose temperature is being regulated, an electrical component housing having input and output terminals and an enclosure therein free from drafts, said enclosure being heated by heat dissipated by the components in said housing, a pair of said input terminals adapted for connection to a source of power, a second temperature responsive resistance element located within said enclosure, a resistance heating means exposed in heat exchange relationship to said second resistance element adapted to heat said element when heat is supplied to the space whose temperature is being regulated, an electrical network including said first and second temperature responsive resistance elements, said network becoming unbalanced when said first temperature responsive resistance element indicates a need for heat or the temperature of said second resistance element drops below a predetermined value, means sensitive to the unbalance of said network for initiating operation of heating means connected to said output terminals and for energizing said resistance heating means, a third temperature responsive resistance element, said third resistance element being located in said enclosure and sensitive to the ambient temperature of said housing, means connecting said resistance element in said network in counterbalancing relation to said second element to prevent the ambient temperature of said enclosure affecting said second resistance element and unbalancing said network, and means supporting said resistance heating means at a point exterior of said enclosure so as to have no appreciable heating effect upon the ambient temperature of said housing.

4. In a control apparatus for a space temperature changing means, an electrical control network for producing a control signal having a plurality of temperature sensitive resistors in circuit therewith, said resistors including a first resistor sensitive to the temperature in a space where the temperature is being regulated, a second temperature sensitive resistor connected in said network, a main electrical component housing having therein a plurality of electrical components including said second resistor and elements for amplifying said signal, a draft-free enclosure therein which is heated by heat dissipated from the electrical components in said housing, a supporting member for a plurality of elements of said network including a third temperature sensitive resistor sensing the ambient temperature within said enclosure, supporting means for said second resistor within said enclosure, a heating element for said second resistor, circuit means for energizing said heating element, and means supporting said heating element outside of said enclosure so that the heat therefrom will not appreciably affect the ambient temperature within said enclosure.

5. In combination, in a temperature regulating apparatus, a first temperature responsive resistor located in an area whose temperature is being regulated, an electrical component housing having input and output terminals and an enclosure therein free from drafts, said enclosure being heated by heat dissipated by the components in said housing, a pair of said input terminals adapted for connection to a source of power, a second temperature responsive resistor located within said enclosure, a resistance heating means exposed in heat exchange relationship to said second resistor and adapted to heat said resistor when heat is supplied to the space whose temperature is being regulated, an outdoor temperature responsive resistor, said outdoor resistor having a resistance which is a measure of the amount of heat needed to maintain a desired temperature in the temperature regulated area, a Wheatstone bridge having included in the arms thereof said first and second resistor and said outdoor resistor, a plurality of resistors located within said enclosure and exposed to the ambient temperature therein, means connecting said resistors in the arms of said bridge, detecting means, said detecting means being operative when energized to initiate operation of area heating means connected to said output terminals and to energize said resistance heating means, means connecting said detecting means to said bridge so that said detecting means is operative when said first resistor indicates a need for heat or the temperature of said second resistor drops below a predetermined value, a third temperature responsive resistor, said third resistor being located in said enclosure and sensitive to the ambient temperature of said enclosure, means connecting said third resistor in counterbalancing relation to said second resistor to prevent the ambient temperature affecting said second resistor from unbalancing said bridge, and supporting means locating said resistance heating means at a point remote from said enclosure so as to have no appreciable effect upon the ambient temperature of said enclosure.

6. In combination, in a temperature regulating apparatus, an electrical component housing, said housing including a plurality of electrical elements including a power transformer which when operative normally dissipate heat, a draft-free enclosure within said housing having a temperature therein dependent upon the heat dissipated by said elements, a Wheatstone bridge, a first temperature sensitive resistor which is located in an area whose temperature is being regulated, a second temperature sensitive resistor which is located in said enclosure and is exposed to the heat dissipated by said elements, a resistance heating means exposed in heat exchange relationship to said second resistor and adapted to heat said resistor when heat is supplied to the temperature regulated area, means supporting said resistance heating means at a point exterior of said enclosure so as to have no appreciable effect on the temperature of the elements located within said housing, an outdoor temperature responsive resistor, means connecting said first and second resistors and said outdoor resistor in the arms of said Wheatstone bridge so that the balance of said bridge is determined by the temperature of each of said resistors, a third temperature sensitive resistor located in said enclosure and exposed to approximately the same amount of dissipated heat as said second resistor, means connecting said third resistor in said bridge in counterbalancing relation to said second resistor so that the dissipated heat from said elements will not unbalance said bridge, detecting means, said detecting means when operative adapted to energize means for heating the temperature regulated area and to energize said resistance heating means, and means connecting said detecting means to said bridge to detect the unbalance of said bridge when said first resistor indicates a need for heat in the temperature regulated area or the temperature of said second or outdoor resistor drops below a predetermined value.

7. In a control apparatus for a space temperature changing means, an impedance network apparatus including first and second temperature responsive impedance members connected together as elements of a balanceable impedance network, relay means connected to said network to respond to the balance thereof, a draft-free enclosure surrounding both of said members so that said members are exposed to the same ambient temperature and tend to compensate each other in said network, supporting means for said first responsive member, a heater element for heating said first temperature responsive member to affect the balance of said network, means including said relay means for energizing said heater element and means including said first named supporting means supporting said heater outside of said enclosure so that heat is conducted from said heater to said first member through said supporting means and the ambient temperature of said enclosure is not affected thereby.

8. In combination in a temperature control apparatus, an impedance network apparatus including first and second temperature responsive resistors and third and fourth temperature responsive resistors, said third and fourth resistors being located in spaced relation in the space whose temperature is being regulated, means connecting said first and second resistors so as to form opposing members of a balanceable electrical network, means connecting said third and fourth resistors as one branch of said balanceable network, a draft-free component housing enclosing both of said first and second resistors and supporting them so as to be exposed to the same ambient temperature conditions to compensate each other for any changes in the ambient temperature, detecting means operable when energized to initiate operation of space heating means, means connecting said detecting means to said balanceable electrical network so that said detecting means is energized when said third and fourth resistors indicate a need for operation of the space heating means, a heater for selectively heating said first resistor to cause it to affect the balance of said network, and means supporting said heater at a point outside said housing so that the same is primarily in heat transfer relationship to said first resistor.

9. Temperature control apparatus, comprising in combination, temperature responsive means including a balanceable impedance network having therein first and second impedances which are variable in accordance with changes in temperature, said first impedance being subjected to a temperature to be maintained substantially constant, unbalance detecting means connected to said networks, relay means operated by said detecting means when said network is unbalanced, said relay means being adapted to energize temperature changing means, circuit means effecting continuous periods of cycling of the temperature changing means, said circuit means comprising said second impedance, a heater positioned in heat exchange relation to said second impedance, and said relay means, a first substantially draft free enclosure surrounding said heater and said second impedance, a second draft free enclosure surrounding a portion of said first enclosure wherein is positioned said second impedance and an ambient temperature compensating resistor connected in said network positioned within said second enclosure but not within said first enclosure.

JOHN M. WILSON.
STANLEY W. NICKELLS.
MYRON R. SMITH.

REFERENCES CITED

The following references are of record in the file of this patent:

UNITED STATES PATENTS

| Number | Name | Date |
|---|---|---|
| 1,715,750 | Gano | June 4, 1929 |
| 2,236,624 | Littwin | Apr. 1, 1941 |
| 2,300,537 | Davis | Nov. 3, 1942 |
| 2,366,501 | Gille | Jan. 2, 1945 |
| 2,403,917 | Gille | July 16, 1946 |
| 2,431,790 | Crosthwait et al. | Dec. 2, 1947 |